Feb. 7, 1967   F. J. RAYMOND, JR   3,303,299
VALVE ACTUATOR AND SWITCH MECHANISM
Original Filed Oct. 9, 1962   2 Sheets-Sheet 1

FRANK J. RAYMOND Jr.
INVENTOR

BY *Norman S. Blodgett*
ATTORNEY

Feb. 7, 1967 F. J. RAYMOND, JR 3,303,299
VALVE ACTUATOR AND SWITCH MECHANISM
Original Filed Oct. 9, 1962 2 Sheets-Sheet 2

FRANK J. RAYMOND JR.
INVENTOR

BY Norman S. Blodgett
ATTORNEY

United States Patent Office 3,303,299
Patented Feb. 7, 1967

3,303,299
VALVE ACTUATOR AND SWITCH MECHANISM
Frank J. Raymond, Jr., Barrington Hills, Ill., assignor to Ramcon Corporation, Worcester, Mass., a corporation of Massachusetts
Continuation of application Ser. No. 229,458, Oct. 9, 1962. This application Jan. 28, 1966, Ser. No. 545,515
1 Claim. (Cl. 200—47)

This application is a continuation of applicant's copending application Serial No. 229,458, filed October 9, 1962, and now abandoned.

This invention relates to electrically powered valve actuators which operate by electricity to open and close valves.

The general objective of the invention is to provide a new and improved, electrically powered valve actuator adapted to be mounted in assembled relation to a valve, specifically a ball valve, to open and close the valve with precision by rotating a flow control member forming a part of the valve.

The inherent character of ball valves has presented challenging problems to the designer of power actuators for such valves. A typical ball valve comprises a centrally bored ball disposed between two circular valve seats which encircle inlet and outlet passages into the valve and fit snugly against the ball. Either opening or closing of the valve is effected by rotating the valve ball through one-quarter turn to swing the ball bore into or out of alignment of the valve seats. Even though the valve seats are slidable on the ball, there is, typically, a pronounced resistance to rotation of the ball, the resistance to ball rotation being multiplied with increases in the size of the valve and with increases in the fluid pressure on the valve ball. Because of the resistance to rotation of the ball and because the energy required to open or close a ball valve must be imparted in one-quarter revolution to a rotatable control member forming a part of the valve, the torque required to rotate the control member of a ball valve can be considerable indeed. Moreover, the valve ball must be located with substantial precision with reference to the valve seats at the end of each quarter revolution of valve opening or valve closing movement of the ball in order to assure maximum opening of the valve and most secure closing of the valve. Typically, ball valves are sold in wide varieties of sizes and designs that present specifically different problems in the operation of the valves by power actuators.

Prior electrical valve actuators have been marked by a number of limitations and practical shortcomings.

One object of the invention is to provide an electrical valve actuator, well suited for use with ball valves, having a new and improved construction which affords many worthwhile advantages lacking in prior valve actuators.

Another object is to provide an electrical valve actuator of the character recited which is electrically powered to electrically drive a flow control element to valve open and valve closed positions by rotation of the flow control element in only one direction and which provides for termination electrically of opening and closing movements of the flow control element precisely in desired open valve and closed valve positions, all by means of compact valve actuating structure well suited for economical manufacture.

A further object is to provide an electrical valve actuator, according to the preceding objects, which serves to locate the flow control element accurately in its optimum open valve position and its optimum closed valve position and which provides great efficiency and torque from compact, economical actuator structure in opening and in closing a ball valve by using the same direction of rotation of the working parts of the actuator for both opening and closing the valve.

Other objects and advantages will become apparent from the following description of the exemplary form of the invention shown in the drawings, in which.

Figure 1:
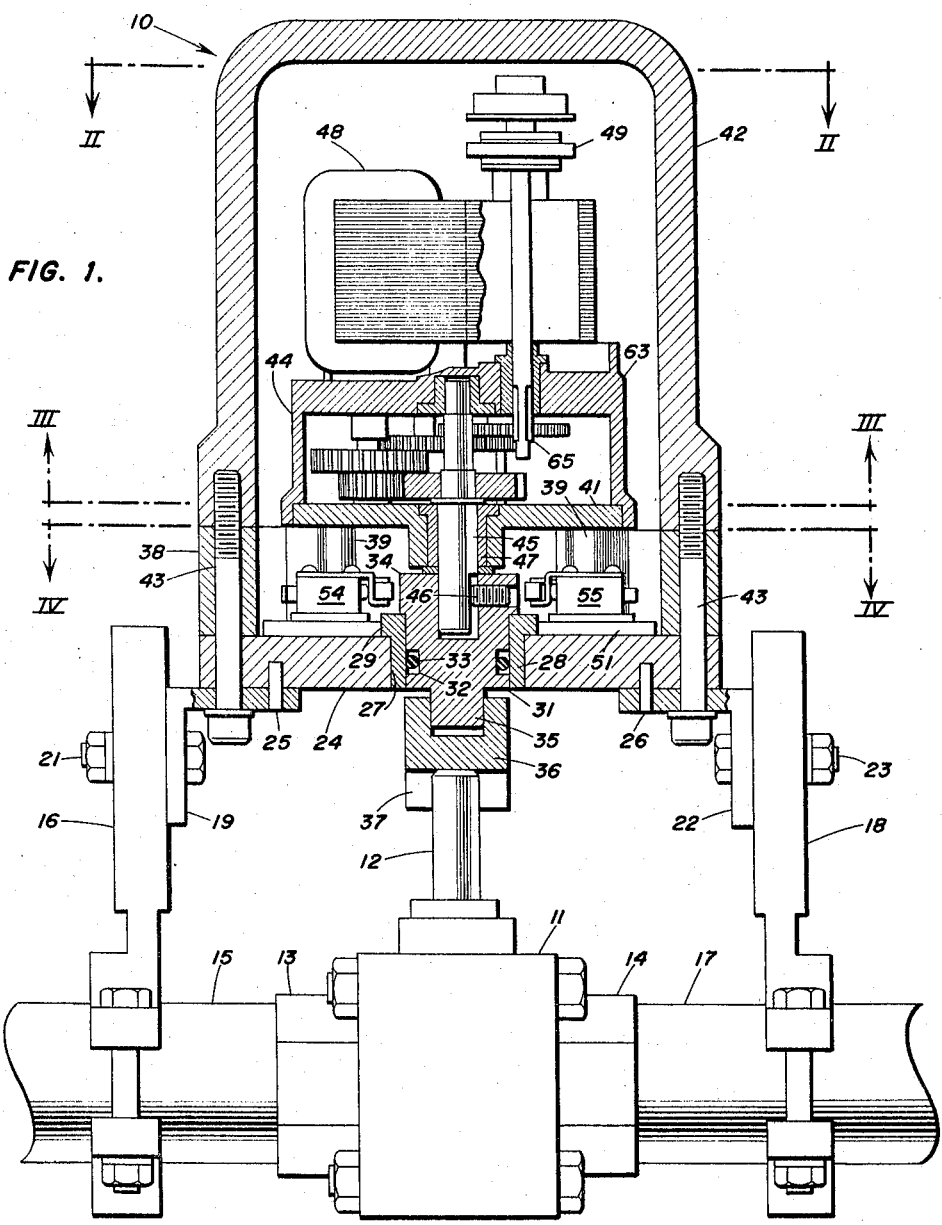
FIG. 1 is a side view, partially in section, showing the assembly of a ball valve and an actuator embodying the invention.
Figure 2:
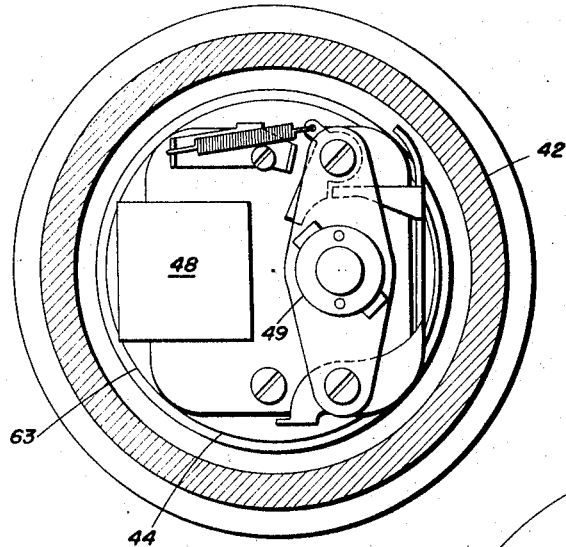
FIG. 2 is a sectional view of the apparatus taken along the line II—II of FIG. 1.

Referring first to FIG. 1, wherein are best shown the general features of the invention, the valve actuator, indicated generally by the reference numeral 10, is shown in use with a ball valve 11 having a vertical actuating stem 12, an inlet 13, and an outlet 14. Extending from the inlet 13 of the valve is a pipe 15 on which is mounted a support 16. Similarly, from the outlet 14 extends a pipe 17 on which is mounted a support 18. The supports 16 and 18 are of the clamping variety and are slotted at their upper ends. Fastened to the upper portion of the support 16 on the side which faces the support 18 is an angle 19 which is fastened to the support 16 by a bolt 21. Similarly, the side of the support 18 which faces the support 16 is provided with an angle 22 which is secured to the support 18 by a bolt 23. The angles 19 and 22 are each provided with upper horizontal surfaces on which rest a first platform 24, the location being determined by a pin 25 which extends upwardly from the angle 19 into a suitable deadend recess in the first platform and a pin 26 which extends upwardly from the angle 22 into another recess in the first platform 24.

The first platform 24 is circular and is provided with a central bore 27 through which extends a bushing 28. This bushing is formed of a bronze alloy providing a good bearing surface and is provided with a flange 29 at its upper end which rests on the upper surface of the first platform 24 in the area around the bore 27.

Mounted in the bushing 28 is a connector member, such as an output shaft cam 31 which has an intermediate cylindrical portion which resides rotatably in the bushing 28 and is provided with a peripheral annular groove 32 in which is mounted a Teflon O-ring 33. The output shaft cam 31 is provided with an enlarged upper portion 34 which will be described more fully hereinafter, but which rests on an upper horizontal surface of the flange of the bushing 28. The shaft cam 31 is also provided with a lower portion 35 which is noncircular and which resides in a slot in an adaptor 36. The lower portion of the adaptor is provided with a slot 37 which extends at a right angle to the upper slot thereof and which engages a noncircular portion of the valve stem 12.

Figure 3:
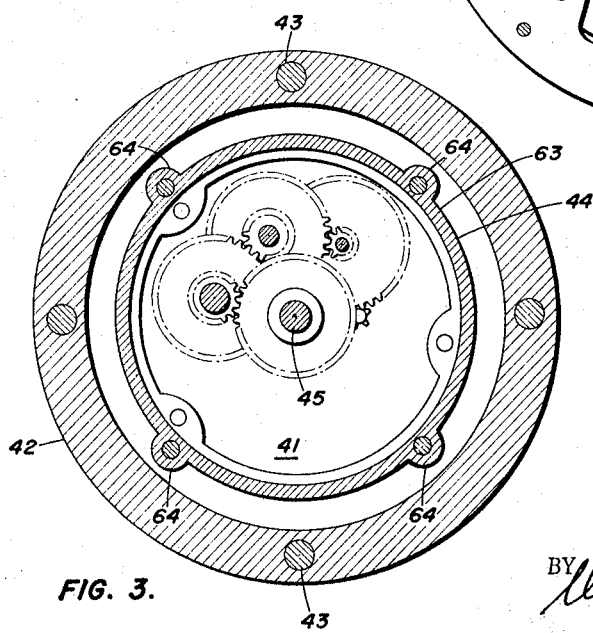
FIG. 3 is a sectional view taken along the line III—III of FIG. 1.

Resting on the upper surface and extending around the periphery of the first platform 24 is a tubular spacer ring 38. This ring is mounted concentrically of the axis of the bushing 28 and the output shaft cam 31; its upper edge is provided with inwardly extending abutments 39 (best shown in FIG. 4), each of which has a horizontal upper surface on which is supported a gear reduction unit 44 providing a second platform 41, this platform having an upper horizontal flat surface which is parallel to and spaced from the corresponding upper surface of the first platform 24. It is evident that the second platform 41 acts as a cover which closes one end of a housing 63 of the gear reduction unit 44. The housing 63 is provided with abutments 64 (see FIG. 3) which rest on the abutments 39 of the spacer ring 38.

Also resting on the upper edge of the spacer ring 38 is a housing 42 which is of an inverted cup-shape and encloses certain elements of the device. Bolts 43 extend upwardly through the angles 19 and 22 through bores in the spacer ring 38 and into threaded holes in the lower edge of the housing 42, thus holding the entire assemblage together. Bolts extend upwardly through the abutments 39 of the spacer ring 38 into the gear reduction unit 44 to hold it in place.

The gear reduction unit 44 is provided with an output shaft 45 which extends downwardly into an upwardly-directed recess in the upper portion 34 of the output shaft cam and is locked therein by a set screw 46. A bushing 47 is mounted in a central bore of the second platform 41 and carries the output shaft 45. Mounted on the top of the gear reduction unit 44 is an electric motor 48 of the high torque variety. As is evident in FIG. 1, the motor 48 is provided with an output shaft 65 at the upper end of which is provided the brake 49. It will be appreciated that the gear reduction unit 44, the electric motor 48 which operates through a shaft 65 to drive the gear reduction unit, and the brake 49 form together a self-contained assembly which for convenience in designation can be accurately denominated as an "electrical power drive unit." This electrical power drive unit has an output shaft 45, previously referred to, which turns in only one direction. The unit is encased in a housing formed by the first platform or base 24 and a deep cover secured to the base 24 and comprising the housing or cover element 42 previously referred to and the annular spacer ring 38 that forms a continuation of the housing or cover element 42 extending to the base 24.

Figure 4:
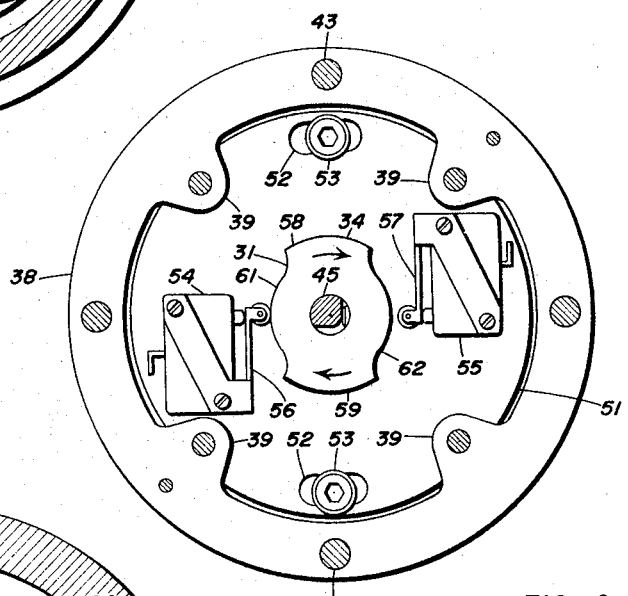
FIG. 4 is a horizontal sectional view taken along the line IV—IV of FIG. 1.

The surface of the first platform 24 carries an adjusting plate 51 which, as is evident in FIG. 4, is provided with opposed concentric slots 52 through which pass bolts 53 extending into threaded holes extending downwardly into the first platform 24. Fastened to the upper surface of the adjusting plate is a limit switch 54 having an actuating arm 56 and a switch 55 having an actuating arm 57. Electrical wires lead outwardly through an outlet which is adapted to prevent the entrance of dust into the unit and to exclude gas or other dangerous materials from being ignited by electrical arcing.

As is evident in FIG. 4, the upper portion 34 of the output shaft cam 31 is generally elongated in form and is provided with end surfaces 58 and 59 which are concentric with the axis of the shaft. Between these end surfaces extend side surfaces 61 and 62. The central portion of each end surface is formed with a convex curve in the form of a circle which is concentric with the shaft 31 but of substantially less diameter than that of the end surfaces 58 and 59. Between each of these intermediate curves and the end surfaces is an ogee transition surface resulting in four sharp corners where the end surfaces and the side surfaces meet.

The operation of the invention will now be readily understood in view of the above description. The wires from the switches 54, 55, and from the motor 48 extend out of the apparatus to a remote location where automatic or manual control may take place. The introduction of current to the motor 48 causes the output shaft 45 of the gear reduction unit 44 to rotate, thus operating through the output shaft cam 31 and the adaptor 37 to rotate the stem 12 of the valve 11 and to change the condition of the valve. This condition change may be from "open" to "closed" or from "closed" to "open" condition. Depending on which type of condition change is taking place, eventually an end surface 59 of the shaft cam 31 will strike one of the switches, such as the actuating arm 56 of the switch 54. This will interrupt the current passing to the motor 48 and, in conjunction with the brake 49, will immediately terminate the rotation of the valve. The brake 49 is of conventional construction commonly used on electric motors and responds automatically to deenergization of the motor 48 to stop rotation of the motor. In order to adjust the position at which rotation of the valve terminates, it is only necessary to loosen the bolts 53 and to rotate the adjusting plate 51. This moves the switches 54 and 55 relative to the upper portion 34 of the shaft and regulates the cut-off point of rotation of the valve by the actuator. In order to obtain access to the chamber which lies between the lower platform 24 and the upper platform 41 it is only necessary to loosen the bolts 43 and the housing 42 may be drawn upwardly. It is possible to make the adjustment without removing the gear reduction unit and the second platform by making use of the spaces between the abutments which are spaced around the platform. That is to say, there is an annular space which lies between the gear reduction unit 44, its housing 63, and the second platform 41, on the one hand, and the inner surfaces of the spacer ring 38, on the other hand, because of the abutments which join them.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

For use in opening and closing a valve, an electrically powered valve actuator adapted to be mounted in coacting relation to a valve having conduits extending from opposite sides thereof; said actuator comprising a self-contained, geared electrical power drive unit having a rotary output shaft that rotates in only one direction; a housing encasing said power drive unit and comprising a base and a deep cover secured together, said cover being formed in part by an annular spacer element engaging said base and forming support means spaced from said base and supporting said drive unit independently of said base and in spaced relation to said base, said base having a bearing therein, a valve rotating member journalled in said bearing and having an inner end continuously connected to said output shaft for rotation by the latter in only said one direction; said valve rotating member having thereon a double lobed, switch operating cam disposed within said housing between said base and said drive unit; said cam being shaped to define on the lobes thereof four sharp cam corners spaced at predetermined radial angles from each other about the axis of rotation of the cam, connector means on the outer end of said valve rotating member for connecting the valve rotating member to a rotatable valve control element, a rotatable switch support plate supported on the inner face of said base in encircling relation to said bearing and having arcuate slots therein, bolt means on said base extending through said slots and releasably engaging said switch support plate to hold the latter in various positions of rotary adjustment on said base, two control switches mounted on said switch support plate, said control switches having actuators positioned for actuation by said cam corners when said valve rotating member turns into each of four successive valve positions rotatably adjustable in unison by rotary adjustment of said switch support plate on said base, said cam corners being positioned on said cam and said switch actuators being positioned on said switch support plate to locate said valve positions of said valve rotating member accurately one-quarter revolution from each other for all rotary positions of adjustment of said switch support plate, two mounting supports secured to said housing and extending therefrom in straddling relation to the outer end of said valve rotating member, and each of said supports comprising conduit clamping means spaced from said housing and adjusting means for adjusting the position of the conduit clamping means in relation to the housing.

References Cited by the Examiner

UNITED STATES PATENTS

| | | | |
|---|---|---|---|
| 2,451,989 | 10/1948 | Smith | 318—266 |
| 2,668,267 | 2/1954 | Chapman. | |
| 2,883,880 | 4/1959 | Merkle | 74—606 |
| 2,989,758 | 6/1961 | Turek et al. | 318—468 X |
| 3,085,781 | 4/1963 | La Pointe | 251—67 |

ORIS L. RADER, *Primary Examiner.*

B. DOBECK, *Assistant Examiner.*